Oct. 27, 1942. F. W. KNOWLES 2,300,229
FREEZER FOR PEAS AND OTHER PRODUCE
Filed Aug. 17, 1938 2 Sheets-Sheet 1

Inventor
F. W. KNOWLES
By Irving A. McCathran
Attorney

Oct. 27, 1942.    F. W. KNOWLES    2,300,229
FREEZER FOR PEAS AND OTHER PRODUCE
Filed Aug. 17, 1938    2 Sheets-Sheet 2
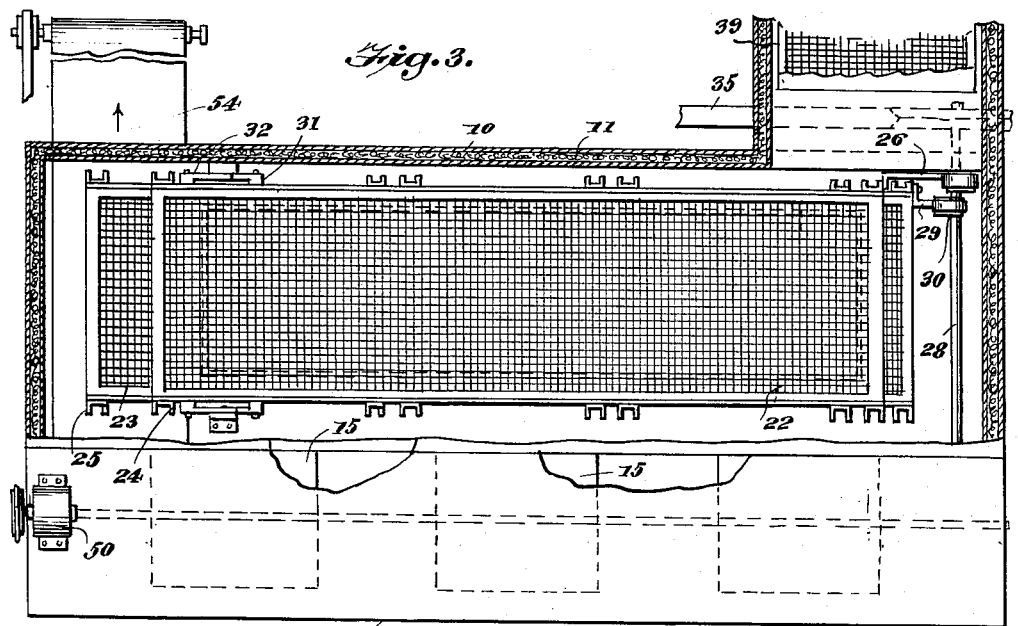
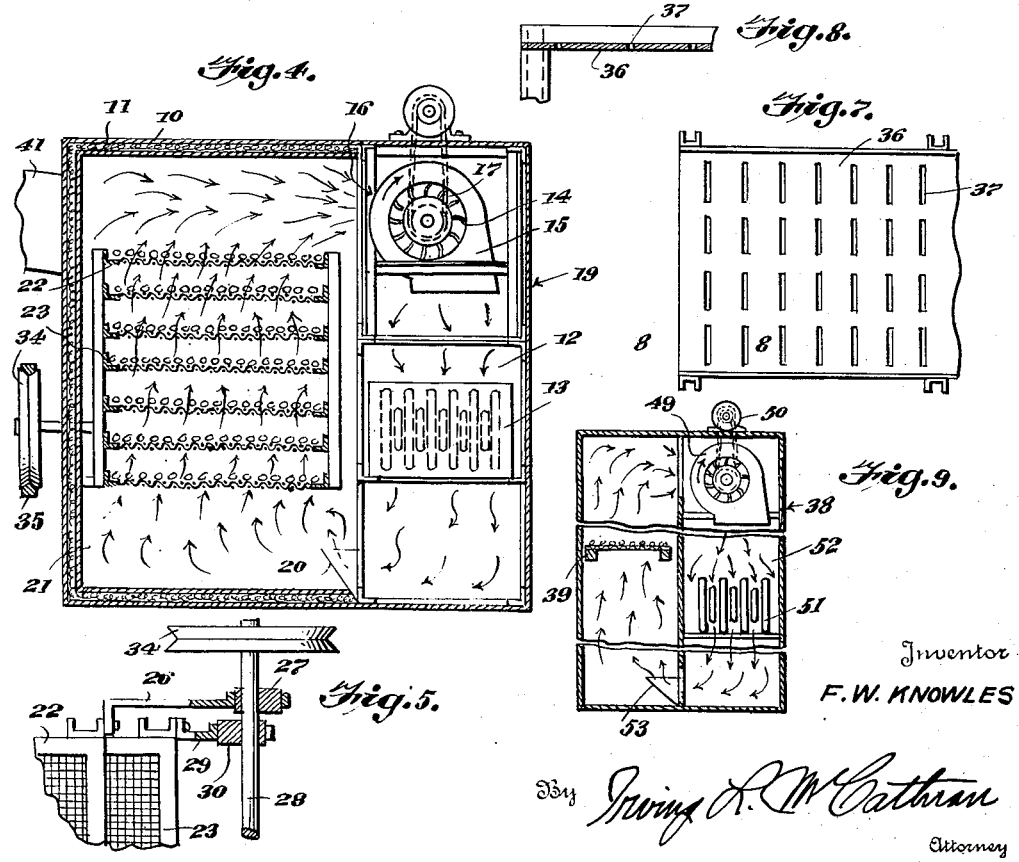
Inventor
F. W. KNOWLES
By Irving R. W. Cathran
Attorney Patented Oct. 27, 1942

2,300,229

UNITED STATES PATENT OFFICE 2,300,229

FREEZER FOR PEAS AND OTHER PRODUCE

Frank W. Knowles, Seattle, Wash.

Application August 17, 1938, Serial No. 225,429

7 Claims. (Cl. 62—102)

This invention relates to a freezer for peas and other produce, and vegetables, fruit and the like, and has for one of its objects the production of a simple and efficient means for quickly and thoroughly freezing the produce as it is fed through the freezing unit from one supporting tray to another and is agitated in its path of movement.

A further object of this invention is the production of a simple and efficient means for passing the produce from one elevation to another through the medium of inclining or sloping agitated screens whereby the produce will be subjected to constantly lowering temperature as the produce passes from the top toward the bottom of the apparatus.

Other objects and advantages of the present invention will appear throughout the following specification and claims.

In the drawings:

Figure 3 is a horizontal sectional view taken on line 3—3 of Figure 2;

Figure 4 is a vertical sectional view taken on line 4—4 of Figure 2;

Figure 5 is a fragmentary top plan view of a portion of the agitating or shaker screens, showing the eccentric actuating means in section;

Figure 7 is a plan view of a modified type of agitating or shaker screen.

Figure 8 is a sectional view taken on line 8—8 of Figure 7;

Figure 9 is a vertical sectional view, of the precooler unit, taken on the line 9—9 of Figure 1.

Figure 1:
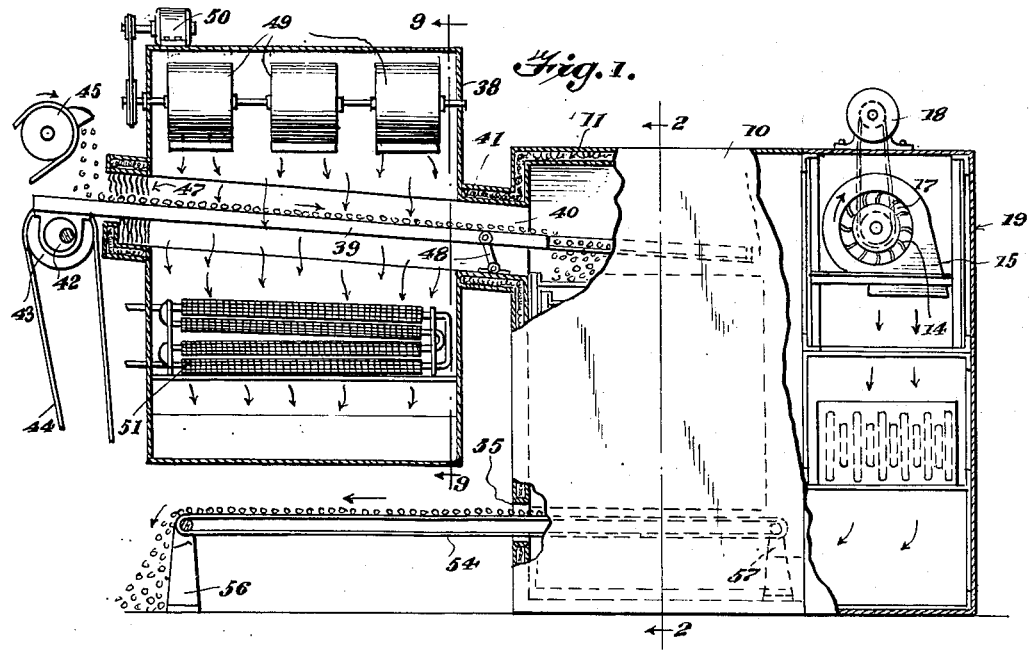
Figure 1 is a vertical sectional view, certain parts being shown in elevation, looking toward one end of the freezing unit and illustrating the improved freezing or refrigerating unit.

By referring to the drawings, it will be seen that 10 designates the body, container, or casing, of the freezer or refrigerating unit which preferably comprises an upright container, the walls of which are insulated as at 11. The container 10 is provided with a freezer unit 12 in which is mounted a freezing coil or element 13 intermediate the upper and lower ends thereof. A fan 14 is mounted within a fan housing 15 carried within the upper end of the freezer unit 12, the fan housing having an air entrance opening 16 at its front end and an air discharge opening 17 on the side thereof. A plurality of these fan housings may be employed, as indicated in Figure 3. The fan 14 within each housing is driven through the medium of a suitable motor 18 carried upon the top of the freezer unit compartment 19 which compartment 19 is located along one side of the casing 10, as shown in Figures 1, 3 and 4. The lower end of the freezer unit compartment 19 is provided with an upwardly inclined deflector trough 20, as shown in Figure 4.

Figure 2:
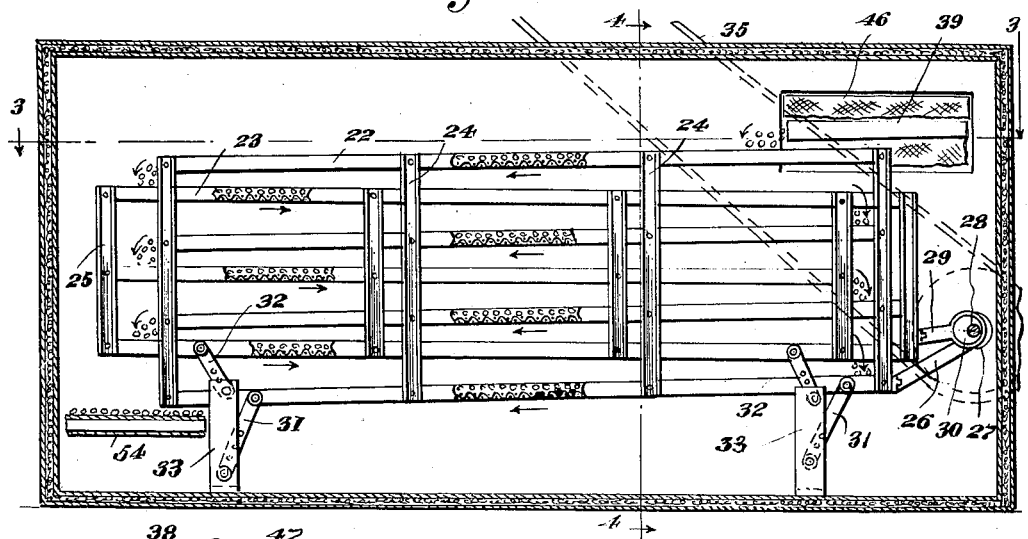
Figure 2 is a vertical sectional view taken on line 2—2 of Figure 1.
Figure 6:
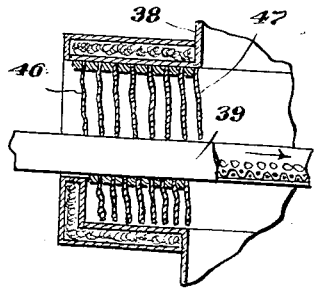
Figure 6 is an enlarged longitudinal sectional view of the entrance portion of the precooler.

The container or casing 10 is provided with a shaker screen compartment 21 to one side of the freezer unit compartment 19, as shown in Figure 4, and a plurality of shaker screens are mounted within the compartment 21, as shown. These shaker screens comprise a screen group 22 and a screen group 23, the screens of the group 23 being interposed between the screens of the group 22, as shown in Figure 2. The screens of the group 22 are tied together by means of vertical tie rails 24 and the screens of the group 23 are tied together by tie rails 25. The screens of the group 23 extend beyond the ends of the screens of the group 22 at one end and terminate short at the other, as shown in Figure 2, and the screens of group 22 are inclined in opposite direction to the screens of group 23 so as to cause the peas or other vegetables upon the screens to fall from one higher screen to a lower screen in a step-by-step manner. The screens of the group 22 are connected to an operating arm 26 which is actuated from an eccentric 27 carried by the driving shaft 28 and the screens of the group 23 are connected to an operating arm 29 which is actuated by an eccentric 30 carried by the shaft 28. The screens in the group 22 are supported upon the pivot supporting links 31 and the screens of the group 23 are supported upon the links 32, the links 31 and 32 being pivotally supported upon the standards 33. The shaft 28 carries a pulley 34 which may be driven by a suitable belt 35 from any point of power supply.

The screens of the groups 22 and 23 may be of any suitable or desired type or character, such as wire mesh screening shown in Figures 3 and 5. As shown in Figures 7 and 8, the screens shown in Figures 3 and 5 may be replaced by screens of the type indicated by the numeral 36 in the nature of metallic plates having slots 37. As used herein, the word screen has been in meaning practically synonymous with the word tray, that is a support having a more or less flat and extended support surface. The surface may have more or less of its area devoted to perforations as shown in the various figures.

In conjunction with the freezing unit, I also use a precooler, such as is indicated by the numeral 38, in Figure 1. The precooler carries a feeding screen 39 which is arranged at an incline, the inner end being inclined downwardly and extending through the opening 40 in the casing 10, the opening 40 being surrounded by a conduit 41 leading from the precooler 38 and through which the inner end of the feeding screen 39 extends. The outer end of the feeding screen 39 is supported upon an eccentric 42 which is driven by a pulley 43 and belt 44. A suitable endless conveyor 45 may be utilized for conveying peas or other produce to the feeder screen 39. A suitable canvas labyrinth 46 surrounds the entrance opening or duct 47, this labyrinth consisting of strips of light canvas separated by small strips of wood set above the unit to prevent loss of too much air from the prefreezer shaker. The inner end of the feeding screen 39 is supported upon the link 48. A plurality of fans 49 are supported within the upper end of the precooler or prefreezer 38 which are driven by a motor 50. A freezing or cooling unit 51 is located at the lower end of the precooler unit 38. The precooling compartment 53 of the unit 38 is preferably placed to one side of the feeding screen 39, as shown in Figure 9, to provide the circulation and the passage of cold air from the bottom upwardly in a manner as indicated by the arrows in Figure 9, and similar also to that shown in Figure 4, to give through each of said compartments a cyclical movement of refrigerated air. As shown in Figure 9, a deflector trough 53 is provided near the lower end of the compartment 52 for directing the current of air upwardly across the screen 39. A discharge conveyor 54 passes out through the opening 55 in the casing 10 and is supported upon the standards 56 and 57 for conveying the peas or other vegetables out through the bottom of the casing 10.

By carefully considering the drawings. it will be seen that the peas are dumped upon the feeding screen 39 from the conveyor 45, and then pass through the precooler 38, this screen 39 being vibrated or shaken for feeding the peas or vegetables upon the upper layer of screens 22 which extend at right angles to the screen 39. The peas or other vegetables are then passed in a downward direction in a step-by-step manner, from the upper to the lower screen and will then be deposited upon the discharge conveyor 54 and carried to a point of disposal. The cooling or freezing unit will cause the cold air to pass out from the compartment 12 up through the bottom of the compartment 21 and through the various screens and back through the fan housing 15 and again down through the compartment 12 completing the cyclical circulation of refrigerated air and causing the lower temperature to be located near the bottom of the compartment 21, thereby causing the vegetables to be passed from a higher to a lower temperature in a step-by-step manner as the vegetables drop from a higher screen to a lower screen, the screens vibrating or shaking to cause the vegetables to roll from one screen to another.

The circulation occurs in the precooler in a manner similar to that previously described and as illustrated in Figure 9. By noting the structure illustrated in the drawing, it will be seen that the produce such as peas and the like will be fed through the relatively narrow opening 47, then through the opening 40 into the compartment 21. The produce will then be spilled upon the upper vibrating screen and will be dropped from one screen to another. The screens may vary from four to eight in number without departing from the spirit of the invention. Through the medium of the device illustrated, produce may be frozen very satisfactorily in a small space and quite rapidly and the low temperature air may pass up from the bottom toward the top in this manner thoroughly freezing the produce. The interior of the device is preferably covered with sheet metal, making it possible to steam out the machine to keep it in a highly sanitary condition.

This cyclic circulation of the air over the coil 13 in the freezer unit 12 and through and around the screens or trays 22 and 23, in the tray compartment, is designated as refrigerating and repassing the air through the tray compartment. This use of the word "repassing" carries the connotation that the same air is used over and over, repassed.

It should be understood that certain detail changes in the mechanical construction, combination and arrangement of parts may be employed without departing from the spirit of the invention so long as such changes fall within the scope of the appended claims.

Having described the invention, what I claim is:

1. A produce freezing apparatus comprising a prefreezing container, an insulated main container, means for passing a low temperature air from the lower end toward the upper end of said main container, means for feeding produce through the prefreezing container and into the upper end of the main container, means for passing produce from a higher elevation to a lower elevation in a step-by-step movement through the main container whereby the produce will be subjected to the action of air of progressively falling temperatures, and means for removing the produce from the lower end of said main container.

2. A produce freezing apparatus comprising a prefreezing container, an insulated main container, means for passing a low temperature air from the lower end toward the upper end of said main container, means for feeding produce through said prefreezing container and into the upper portion of the main container, discharge means for removing produce from the lower portion of the main container, vibrating and conveyor means upon which produce is deposited from said feeding means located in said main container intermediate the inlet and outlet ends of the container, and said conveyor means comprising superimposed foraminous trays alternately sloping in opposite directions with the lower end of each tray terminating short of the upper end of the tray below it for passing the produce from one tray to another and causing the produce to be successively passed back and forth longitudinally of the main chamber from the top towards the bottom thereof through regions of progressively reduced temperatures to the discharge means.

3. A produce freezing apparatus of the class described, comprising: an insulated container, a compartment communicating with the upper end of the container, a feeder tray extending through said compartment, said container having an inlet opening communicating with said compartment, said feeder tray extending through the opening for delivering produce into said container, means for creating a current of cooled air and for removing sensible heat from the produce while said produce passes through the compartment and over the feeder tray, agitating and conveying means located within the container for passing the produce progressively from a higher to a lower temperature region in its path through the container, means for admitting a blast of low temperature air into the lower end of the container, and means for removing the air from the upper end of the container.

4. A produce freezing apparatus, comprising: a prefreezing compartment, a main freezing compartment, means for refrigerating and passing air through said prefreezing compartment, means for refrigerating and passing air through said main compartment, and means for agitating and conveying produce through said prefreezing and then through said main compartment while it is being frozen by the passage and contact of the refrigerated air.

5. A produce freezing apparatus, comprising: a prefreezing compartment, a main freezing compartment, means for refrigerating and maintaining separate air masses and for cyclically passing each air mass through only one of said compartments, and means for agitating and conveying produce through said prefreezing and then through said main compartment while such produce is being frozen by the passage and contact of the refrigerated air.

6. A produce freezing apparatus, comprising: a prefreezing compartment, a main freezing compartment, means for refrigerating and cyclically passing air through said prefreezing compartment, means for refrigerating and cyclically passing air, other than the first mentioned, through said main compartment, and means for agitating and conveying produce through said prefreezing and then through said main compartment while it is being frozen by the passage of the refrigerated air.

7. A produce freezing apparatus, comprising: a tray adapted to have produce fed thereto, means for shaking said tray to agitate the produce that may be thereon, and means for refrigerating and cyclically passing air into contact with said tray and the produce that may be thereon to freeze said produce while such is being agitated.

FRANK W. KNOWLES.